March 19, 1946.  L. C. LESLIE  2,396,921
RELEASE HOOK FOR AIRCRAFT AND THE LIKE
Filed Aug. 18, 1944
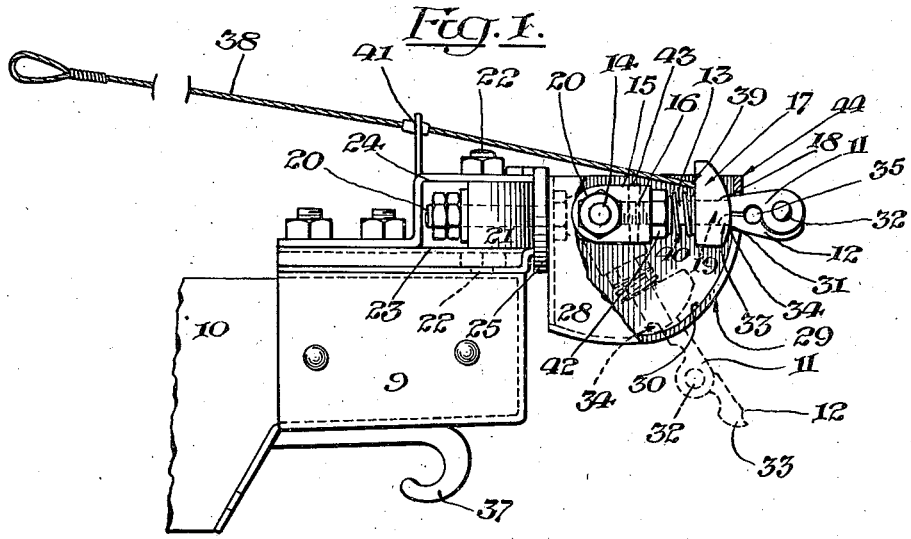
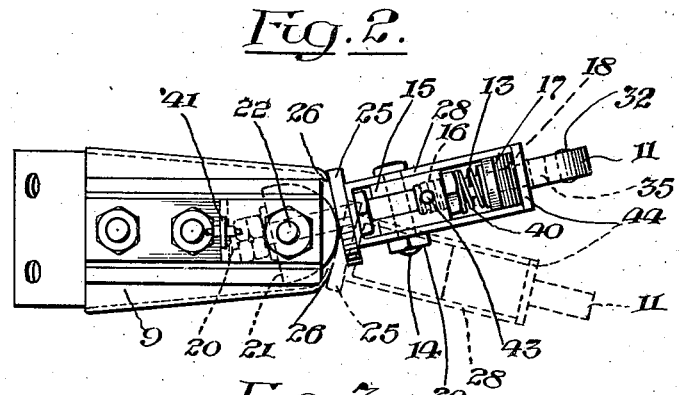
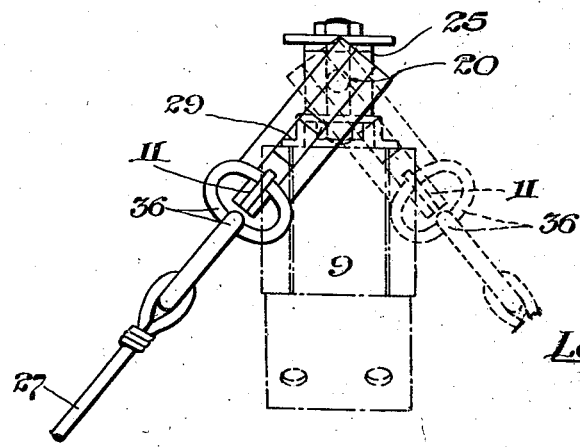
INVENTOR.
Leonard Charles Leslie
BY Francis E. Boyce
ATTORNEY.

Patented Mar. 19, 1946

2,396,921

UNITED STATES PATENT OFFICE 2,396,921

RELEASE HOOK FOR AIRCRAFT AND THE LIKE

Leonard Charles Leslie, Northmead, Benoni, Transvaal, Union of South Africa

Application August 18, 1944, Serial No. 550,008
In Union of South Africa March 24, 1944

6 Claims. (Cl. 244—3)

This invention relates to release hooks for detaching the launching or towing rope or cable used in launching or towing aircraft such as gliders, sail-planes and the like.

The object of this invention is to provide a hook or holding device for the end of the launching or towing rope embodying mechanism for the normal release of said rope by manual operation of the flyer but which, should the flyer neglect to effect the release, will function to release the rope automatically when such rope makes a dangerous or undesirable angle with the longitudinal axis of the towed craft. A further object is to provide in such mechanism a normally closed hook with one half hinged and locked by a spring held block sliding on the stem of the hook and capable of movement towards its end. The stem of the hook is connected by a swivel attached to the nose of the aircraft and the sliding of the block thereon is effected in the normal way by the pull of a cord. Otherwise the sliding of the block is effected by its contact with cams fixed in suitable relation to the axis of the swivel holding the end of the stem of the hook, the movement of the hook about the swivel being effected by the towing rope.

The accompanying drawing illustrates the preferred form of the apparatus in which:

Fig. 1 is the assembly with part broken away.

Figs. 2 and 3 are diagrammatic views.

9 is a metal box attached to and forming the nose 10 of the aircraft, 11 is the hook having the hinged piece 12 for closing the same. 13 is the stem of the hook 11 pivoted on a pin 14 passing through a perforated head 15 screwed onto the end 16 of the stem 13. 17 is a block having conveniently a polygonally shaped hole 18 sliding on a similarly shaped part 19 of the stem 13. 20 is an eye bolt adapted to rotate in a bearing block 21 which is secured to the box 9.

The block 21 may be fixed directly to the box 9 but as illustrated it is made to swivel on pintles 22 which extend through the lower part of the housing 23 and also the top plate 24 fastened to the housing 9. The extent of the swing or angular movement of the block 21 is limited as shown by its flange 25 making contact with the edges 26 of the housing as shown in Fig. 2 which is a diagrammatic plan view. Fig. 3 is a diagrammatic end view showing how the entire hook 11 is allowed to swivel on bolt 20 when the pull of the launching rope 27 is at an angle to the vertical.

28 is a boxlike cover having a slot in its curved front face 29, the turned in edges 30 of which form cam surfaces which, when the hook 11 moves down towards the position shown by the dotted lines in Fig. 1, make contact with the edges 31 of block 17 and move it on stem 13 towards the head 15 of hook 11 and so allow hook 11 to open (as shown by the dotted lines Fig. 1).

The hook 11 has a portion 12 hinged at 32 and a tongue 33 adapted to be retained in recess 34 in the block 17 to keep hook 11 closed. The portion 12 also provides an opening 35 for the towing rope 27 or terminal rings 36 attached thereto. When, due to the swing of the stem 13 about 14, the cams 30 move block 17 towards 14, the recess 34 moves away from tongue 33 and the hook 11 opens to release the launching or towing rope 27 which may be carried in the hook 11 by being attached to one of the rings 36, as shown in Fig. 3.

37 is a hook used for towing the aircraft over the ground. 38 is a cord attached at one end 39 to the block 17 by which normally the block 17 is pulled by the pilot against the pressure of spring 40 away from hook 11 to allow the latter to open. 41 is a guide for cord 38. It will be noted that the end of stem 13 is threaded at 16 and that by turning head 15 the position of the block 17 in relation to cams 30 may be adjusted and consequently the angle may be chosen most suitable for release. It is locked in position by locking nut 42 and if desired by pin 43.

In operation the aircraft having been brought to the launching position and the launching rope 27 connected to hook 11 the pull is in line with the axis of the aircraft and the hook 11 remains closed. With continued movement at the necessary speed due to the pull of the launching rope the aircraft rises in the air. Its flying speed is of course obtained from the pull of the launching rope which may be wound onto a drum in a winch (not shown). Normally the aircraft will fly towards the winch and the launching rope be released by the pilot before he has got to a vertical position over the winch. Normally, that is without the fitting of this invention. Should he fail to release the rope just before he reaches or when he is over the winch the pull of the rope will be downward; the nose of his aircraft will be pulled down and there will be danger of a crash. Generally provision is made to cut the launching rope if it is not released at the proper time but even if this is done the danger still exists of the nose being pulled down by the trailing length of rope being entangled in objects on the ground. This description particularly applies to the launching of gliders.

In an aircraft fitted with this invention when approaching to a position above the winch the angle made between the launching rope 27 and the longitudinal axis of the aircraft must constantly decrease and approach the vertical. This means that the hook 11 will approach the position shown by the dotted line in Fig. 1 by swinging down about the pin 14. In such a position it has carried the block 17 over the cams 30 which force the block 17 up to compress the spring 40. This results in the tongue 33 of the hinged portion of hook 11 being released. The hook then opens automatically to release the launching rope 27 and the aircraft is free to continue its flight without being pulled down by the towing rope 27.

If, for any reason, the aircraft does not fly directly towards the winch and the launching rope is in other than an approximately vertical plane below the aircraft the swivel of the bolt 20 in block 21 will allow the hook 11 to take up a proper position in relation to the pull of rope 27. For the same reason the block 21 if desired may allow the whole hook mechanism to swivel to a limited extent on pins 22 as already described.

As shown in Fig. 1 a block 44 may limit the upward swing of the hook 11 so that the latter cannot swing above the normal longitudinal axis of the aircraft.

Instead of the cam surfaces 30 it will be understood that movement of the block 17 or other equivalent means for operating hook 11 may be employed, for instance links (not shown) suitably pivoted between 14 and 17 may be provided.

The application of the invention to the launching of gliders has been described but it will readily be seen that in other circumstances as when, for instance, the glider is being towed by a powered aircraft the hook may have a full 180° movement and a release effected in an upward pull in addition and in a similar manner to the downward pull described.

This invention provides a releasing hook for the launching rope or if desired for a towing rope for aircraft which can be set automatically to release the rope when its pull in relation to the aircraft assumes a dangerous angle but which at all times can be readily released by the pilot.

Having now particularly described and ascertained the nature of my said invention and in what manner the same is to be performed, I declare that what I claim is:

1. In a device for holding and releasing the rope used for launching or towing aircraft the combination of a hook, a closing piece hinged to the hook, a stem for the hook, a block slidable on said stem, a tongue on said hinged piece, a recess in the block to engage the tongue, a mounting engaging the end of the stem to allow the hook to swing up and down and sideways, cams in the downward path of the block to engage with the same and a spring for forcing the block on the stem towards the hook.

2. In a device for holding and releasing the rope used for launching or towing aircraft the combination of a hook, a closing piece hinged to the hook, a stem for the hook, a block slidable on said stem, a tongue on said hinged piece, a recess in the block to engage the tongue, a mounting engaging the end of the stem to allow the hook to swing up and down and sideways, cams in the downward path of the block to engage with the same, a spring forcing the block on the stem towards the hook, and a connection to the block extending therefrom to a position within reach of the flyer.

3. In a device for holding and releasing the rope used for launching or towing aircraft the combination of a hook, a closing piece for the hook, a stem for the hook, a pin through the end of the stem to allow it to swing up and down, an eye bolt carrying the pin, a swivelling piece allowing the eyebolt to rotate therein, a boxlike casing for the stem of the hook from which the latter projects, cams in the casing and in the path of the swing of the hook and engaging closing and opening means for the hook, a connection for manually opening the hook and a spring to resist such movement.

4. In a device for holding and releasing the rope used for launching or towing aircraft the combination of a hook, a closing piece hinged to the hook, a stem for the hook, a block slidable on said stem, a tongue on said hinged piece, a recess in the block to engage the tongue, a mounting engaging the end of the stem to allow the hook to swing up and down and sideways, cams in the downward path of the block to engage with the same, a spring for forcing the block on the stem towards the hook and a screw threaded end of the stem for altering the position of the engagement of the cams acting to open the hook.

5. In an aircraft towing device, the combination of a hook having a pivotally mounted member normally closing the hook, an elongated stem carried by said hook and mounted for pivotal movement on the aircraft, means slidable on said stem for maintaining the pivoted hook member in hook-closing position when in alinement with the longitudinal axis of the aircraft, and cam means in the path of angular movement of said slidable means when the stem is swung on its pivot to a predetermined angle with relation to the longitudinal axis of the aircraft thereby to release the pivoted hook member and permit the same to swing on its pivot into hook-opening position.

6. In an aircraft towing device, the combination of a hook having a pivotally mounted member normally closing the hook, an elongated stem carried by said hook and mounted for pivotal movement vertically and horizontally of the longitudinal axis of the aircraft, means slidable on said stem for maintaining the pivoted hook member in hook-closing position when in the horizontal plane of said longitudinal axis of the aircraft, and cam means in the path of angular movement of said slidable means when the stem is swung on its pivot in a vertical plane to a predetermined angle with relation to the longitudinal axis of the aircraft thereby to release the pivoted hook member and permit the same to swing on its pivot into hook-opening position

LEONARD CHARLES LESLIE.